United States Patent [19]

Isshiki

[11] Patent Number: 4,821,516

[45] Date of Patent: Apr. 18, 1989

[54] STIRLING CYCLE ENGINE

[75] Inventor: Naotsugu Isshiki, Tokyo, Japan

[73] Assignee: Aisin Seiki Kabushiki Kaisha, Kariya, Japan

[21] Appl. No.: 224,303

[22] Filed: Jul. 26, 1988

[30] Foreign Application Priority Data

Jul. 31, 1987 [JP] Japan ................................ 62-190147

[51] Int. Cl.[4] ............................ F02G 1/04; F03G 7/06

[52] U.S. Cl. ........................................ 60/517; 60/524; 60/641.14; 60/641.8

[58] Field of Search ............. 60/641.8, 641.14, 641.15, 60/517, 524

[56] References Cited

U.S. PATENT DOCUMENTS

| | | | |
|---|---|---|---|
| 3,029,596 | 4/1962 | Hanold et al. | 60/524 |
| 4,038,557 | 7/1977 | Gildersleeve, Jr. et al. | 60/641.14 X |
| 4,055,948 | 11/1977 | Kraus et al. | 60/641.8 |
| 4,089,174 | 5/1978 | Posnansky | 60/641.14 |
| 4,095,428 | 6/1978 | Warren | 60/641.8 |
| 4,236,383 | 12/1980 | Selcuk | 60/524 X |
| 4,345,645 | 8/1982 | Bratt | 60/524 X |
| 4,457,133 | 7/1984 | Almström et al. | 60/524 |

*Primary Examiner*—Allen M. Ostrager

*Attorney, Agent, or Firm*—Burns, Doane, Swecker & Mathis

[57] ABSTRACT

A Stirling cycle engine includes a cylinder and a displacer piston received in the cylinder. The cylinder has a cylinder head for receiving external heat radiation. The cylinder head is made of a transparent top wall for passing the heat radiation. Inside the transparent top wall, there is provided a heat absorbing layer for absorbing the heat of the radiation. The working fluid is passed through the heat absorbing layer in the isovolumetric heating stroke.

7 Claims, 5 Drawing Sheets

STIRLING CYCLE ENGINE

BACKGROUND OF THE INVENTION

1. Field of the Invention

The present invention relates to a Stirling cycle engine, and more particularly to a Stirling cycle engine having radiation heating means.

2. Description of the Prior Art

Conventional Stirling cycle engines are operated under the Stirling cycle where the working gas is subjected to repeated working cycles each including an isovolumetric heating, an isothermal expansion, an isovolumetric cooling and an isothermal compression. For the isothermal expansion, the engine is provided with an external heat source. During the operating cycle, the energy of the working gas is taken out through a piston mechanism. FIG. 6 shows a typical example of a Stirling engine having radiation heating means for heating the cylinder heat of the engine.

Referring to FIG. 6, the engine has a cylinder 13 which is provided at a lower end portion with a crankcase 13*a*. At the upper end portion of the cylinder 13, there is provided a cylinder head 16. As shown in FIG. 6, the cylinder head 16 has a cylindrical skirt portion 16*a* which encircles the upper portion of the cylinder 13 to provide an annular space 16*b* between the upper portion of the cylinder 13 and the skirt 16*a*. The lower portion of the skirt 16*a* of the cylinder head 16 is radially expanded to provide an enlarged annular space 16*c* between the skirt 16*a* and the upper portion of the cylinder 13.

A displacer piston 10 is disposed in the upper portion of the cylinder 13 for axial sliding movements. The displacer piston 10 defines a chamber 6 of a variable volume between the piston and the cylinder head 16. The volume of the chamber 6 changes as the piston reciprocates in the cylinder 13. A piston rod 10*a* is secured at the upper end to the piston 10 and has a york 10*b* at the lower end. The lower end of the piston rod 10*a* is connected through the york 10b with a connecting rod 10*c* which connects the piston rod 10a with a crankshaft 12. The crankshaft 12 has an L-shaped crankarm having arm portions 12*a* and 12*b*. The connecting rod 10*c* is connected with the crankarm 12*a*. A working piston 11 is slidably mounted on the piston rod 10*a* and has an outer peripheral surface which slides along the inner wall of the cylinder 13. The working piston 11 is connected through a connecting rod 11*a* with the arm portion 12*b* of the crankshaft 12. In the cylinder 13, there is defined a second chamber 6*a* between the displacer piston 10 and the working piston 11. The cylinder 13 is formed with a plurality of apertures 13*a* which connect the second chamber 6*a* with the enlarged annular chamber 16*c*. In the annular chamber 16*b*, there is provided a heat-accumulator 14. In the enlarged annular chamber 16*c*, there is a cooling unit 15.

The engine shown in FIG. 6 is applied in operation with heat radiation from an external source at the cylinder head 16 as shown by arrows 4. The displacer piston 10 and the working piston 11 are reciprocated in the cylinder 13 in an out-of-phase relationship. The phases of operations of the pistons 10 and 11 are determined by the angular relationship between the arm portions 12*a* and 12*b* of the crankshaft 12 so that the isovolumetric strokes and the expansion and compression strokes are applied to the working gas in the chambers 6, 16*b*, 16*c* and 6*a*. The cylinder head 16 receives thermal energy from the heat radiation applied thereto and gives the heat to the working gas in the chamber 6.

As the displacer piston 10 moves upward, the working gas in the chamber 6 is displaced to the annular chamber 16*b* and through the enlarged annular chamber 16*c* and the apertures 13*a* into the chamber 6*a*. As the working gas passes through the heat accumulator 14, the thermal energy in the gas is absorbed by the heat accumulator 14 to be stored therein. The working gas is then cooled by the cooling unit 15 in the enlarged annular chamber 15. In this period of operation, the movement of the working piston 11 is such that the overall volume of the chambers are substantially unchanged so that the working gas is subjected to the isovolumetric cooling.

Then, the working piston 11 is moved upward to compress the working gas in the chamber 6*a*. Thus, the isothermal compression is carried out. As the displacer piston 10 starts to move downward, the working gas in the chamber 6*a* is displaced from the chamber 6*a* through the annular chambers 16*b* and 16*c* into the chamber 6. During this period, the gas is heated by the heat accumulator 14 in the annular chamber 16*b*. The movement of the working piston 11 is such that the overall volume of the chamber is unchanged so that isovolumemetric heating is carried out. Thereafter, the working piston 11 is moved downward together with the displacer piston 10 so that the overall volume of the chambers is increased to thereby carry out the isothermal expansion. As the result of this operation, the crankshaft 12 is rotated in the direction shown by an arrow 23.

It will be noted in the conventional structure that the heat radiation is applied to the cylinder head to heat the same. The conventional engine is therefore of a heavy structure and has a slow responsive characteristics.

SUMMARY OF THE INVENTION

It is therefore an object of the present invention to provide a Stirling cycle engine in which the cylinder head is made of a light material.

Another object of the present invention is to provide a Stirling cycle engine having an improved responsive characteristics.

According to the present invention, the above and other objects can be accomplished by a Stirling cycle engine having a cylinder head made of an optically transparent material. In the inside of the transparent cylinder head, there is provided gas permeable heat receiving means which is arranged so that the working gas is forced to flow therethrough.

Thus, according to the present invention, there is provided a stirling cycle engine including cylinder means having cylinder head means and piston means disposed in said cylinder means to define working chamber means in said cylinder means, fluid passage means for passing working fluid into and out of said working chamber means, said fluid passage means being provided with cooling means for cooling said working fluid, heat accumulating means and heating means for heating said fluid passage means, said heating means including transparent wall means provided in said cylinder head means for passing head radiation into said fluid passage means and fluid permeable heat receiving means provided in said passage means to receive heat radiation which has passed through said transparent wall means. The engine may be located at a position where the solar energy is received through the transparent wall means. The heat receiving means is fluid permeable so that the working fluid in the passage is passed through the heat receiving means to be heated thereby. The transparent wall means may be formed by a quartz glass which has a high light transparency and a high temperature resistance. In accordance with the features of the present invention, the cylinder head can be made light in weight and heat absorbing efficiency of the heating means is significantly improved.

The above and other objects and features of the present invention will become apparent from the following description of preferred embodiments of the present invention taking reference to the accompanying drawings.

DESCRIPTION OF THE PREFERRED EMBODIMENTS

Figure 1:
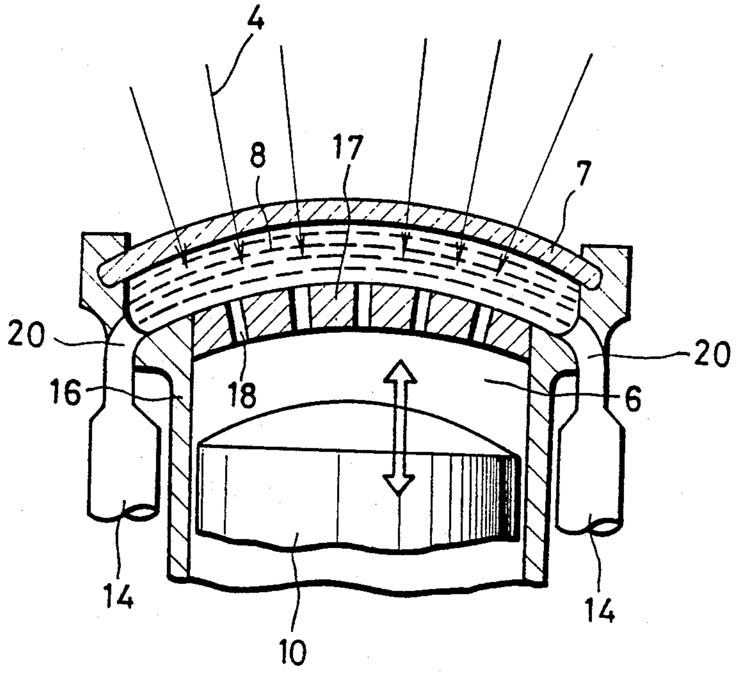
FIG. 1 is a fragmentary sectional view showing the cylinder head portion of a Stirling cycle engine in accordance with one embodiment of the present invention.
Figure 2:
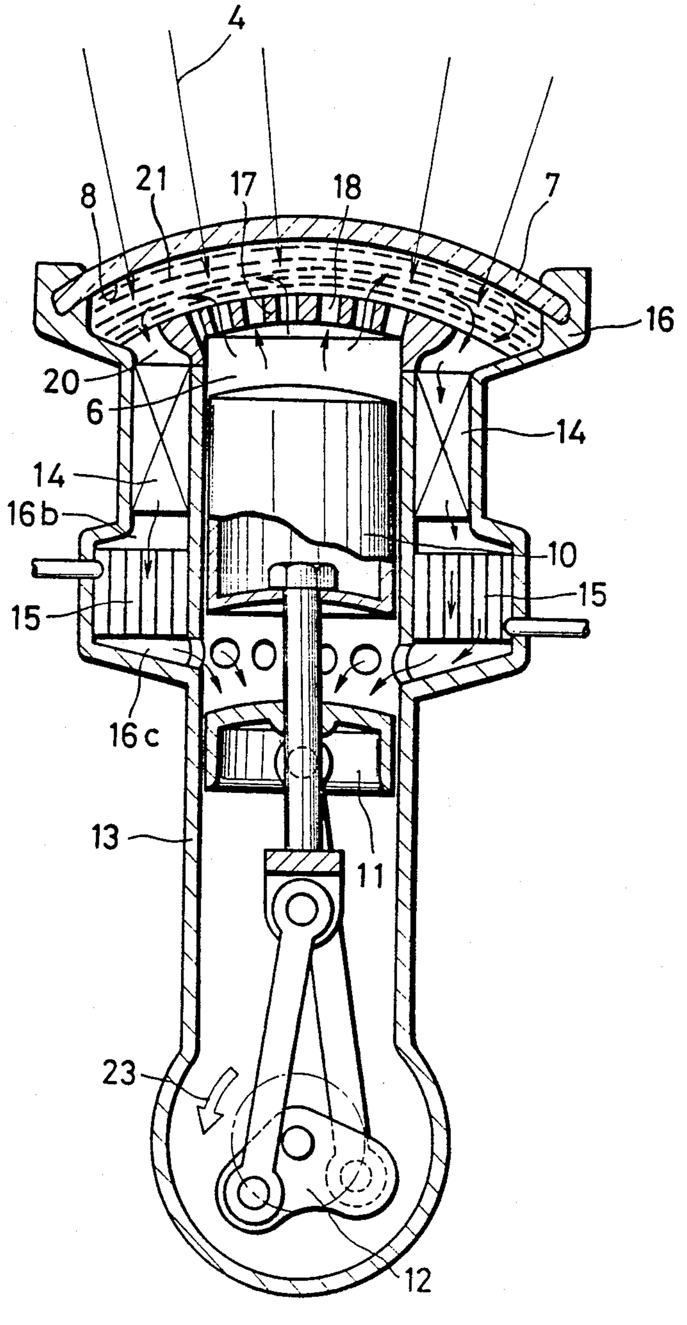
FIG. 2 is a sectional view of a Stirling cycle engine having a cylinder similar to that shown in FIG. 1.
Figure 6:
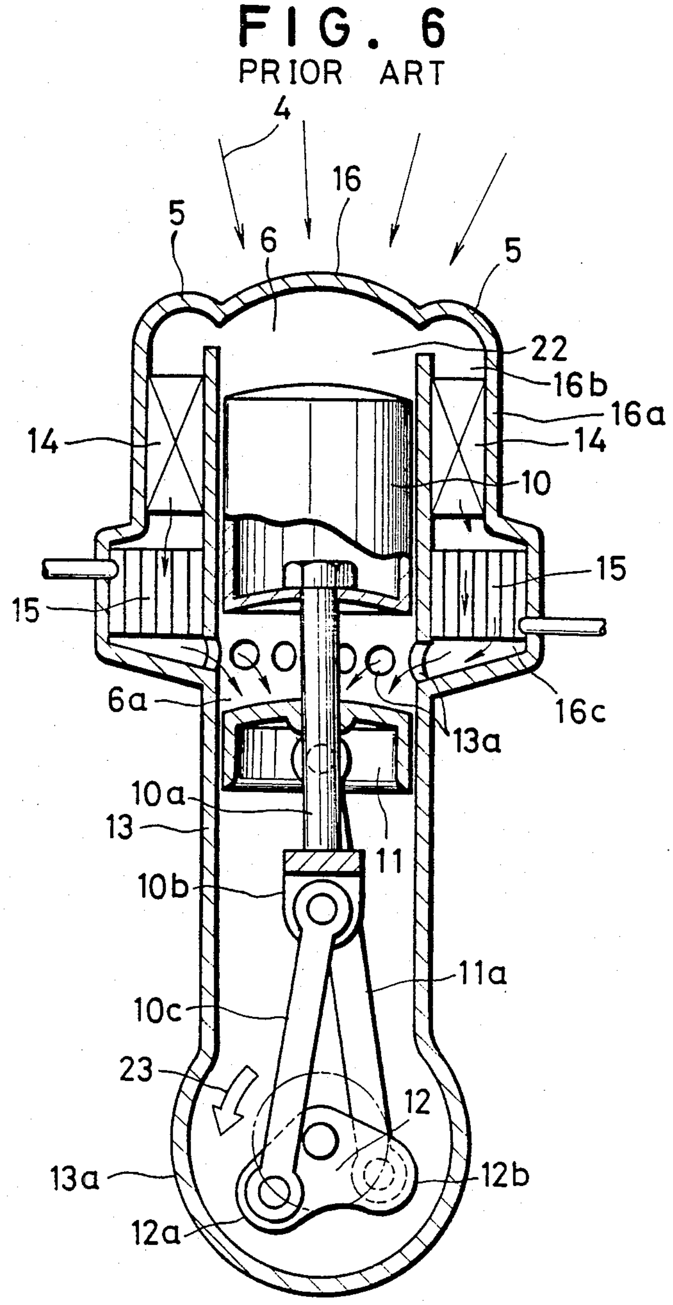
FIG. 6 PRIOR ART

Referring to FIG. 2 together with FIG. 1, there is shown a Stirling cycle engine which has a basic structure similar to that described with reference to FIG. 6 so that detailed description of the general structure will be omitted by showing corresponding parts by the same reference characters. In the embodiment, the cylinder head 16 has a top wall 7 which is made of a transparent material such as a quartz glass. At the top of the cylinder 13, there is a top wall 17 having a plurality of apertures 18. In the cylinder 13, there is defined a working chamber 6 between the displacer piston 10 and the top wall 17. Between the transparent top wall 7 of the cylinder head 16 and the top wall 17 of the cylinder 13, there is defined a passage portion 8 which is connected with the annular space **16*b* through connecting passages 20. In the passage portion 8, there is a heat absorbing layer 21** which may be made of a net of a black metallic material such as a steel, ceramic fiber material, or carbon felt. It should be understood that several layers of such materials may be laid one over the other to provide a desired heat absorbent capacity.

With the structure shown in FIGS. 1 and 2, the solar radiation is injected as shown by arrows 4 through the transparent top wall 7 into the heat absorbing layer 21 in the passage portion 8. The heat absorbing layer 21 in the passage portion 8 is therefore heated by the solar energy injected thereto. The working fluid absorbs the heat from the heat absorbing layer 21 in the passage portion 8 as it passes from the passage portion 8 to the working chamber 6 so that the isothermal expansion stroke is carried out. In other respects, the operation of the engine is the same as that of the conventional engine described with reference to FIG. 6.

The engine shown in FIGS. 1 and 2 is advantageous in that the cylinder head structure can be made light in weight as compared with the conventional structure. Further, the efficiency of absorbing the solar energy can be significantly improved so that the responsive characteristics of the engine can be improved.

Figure 3:
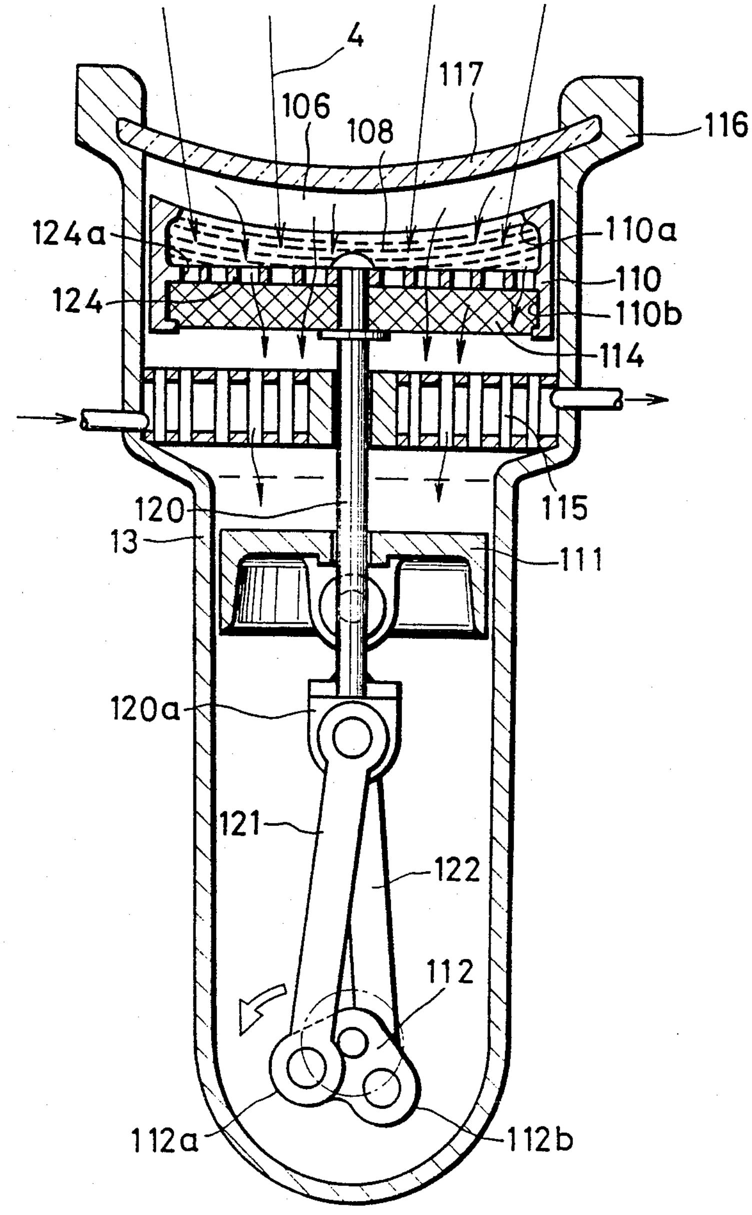
FIG. 3 is a sectional view showing a Stirling cycle engine in accordance with another embodiment of the present invention.

FIG. 3 shows another embodiment of the present invention. In this embodiment, the engine includes a cylinder 113 which has a lower small diameter cylinder portion **113*a* and a large diameter cylinder portion 113*b* which is located above the cylinder portion 113*a*. In the small diameter cylinder portion 113*a*, there is provided a working piston 111 which is axially slidable in the cylinder portion 113*a*. In the large diameter cylinder portion 113*b*, there is provided a displacer piston 110 for slidable axial movement in the cylinder portion 113*b*. The displacer piston 110 is formed with a perforated web 124 having a plurality of apertures 124*a*. The displacer piston 110 is formed above the perforated web 124 with a cavity 110*a* which is filled with a heat absorbent material 108. The displacer piston 110 is further formed below the perforated web 124 with a cavity 110*b* which is filled with a net of a metallic material which constitutes a heat accumulator 114**.

The cylinder 113 has an open top end which is covered by a top concave wall 117 of a transparent material such as a quartz glass. Between the displacer piston 110 and the transparent top wall 117, there is defined a chamber 106. Between the displacer piston 110 and the working piston 111, there is provided a cooling unit 115. The displacer piston 110 is fitted to the top end of a piston rod 120 which is formed at the lower end with a york **120*a*. A connecting rod 121 is connected at one end with the york 120*a* of the piston rod 120 and at the lower end with one arm portion 112*a* of the crankarm of a crankshaft 112. The working piston 111 is slidably fitted to the piston rod 120. A second connecting rod 122 is connected at one end with the working piston 111 and at the other end with the other arm portion 112*b* of the crankshaft 112**.

In operation, the displacer piston 110 is moved downward to displace the liquid in the chamber between the pistons 110 and 111 into the chamber 106 which is formed between the transparent top wall 117 and the displacer piston 110. In this stroke of operation, the working piston 111 remains substantially stationary so that the overall volume of the chambers is maintained substantially constant. The working fluid displaced into the chamber 106 is heated by the heat stored in the heat absorbing material. Thus, the isovolumetric heating is carried out. Then, the working piston 111 starts to move downward so that the overall volume of the chambers is increased to carry out the isothermal expansion. The displacer piston 110 is then moved upward to displace the working fluid in the chamber 106 into the chamber between the pistons 110 and 111. In this course of operation, the fluid is cooled by the heat accumulator 114 and the cooling unit 115 to carry out the isovolumetric cooling. Thereafter, the working piston 111 is moved upward to isothermally compress the working fluid.

Figure 4:
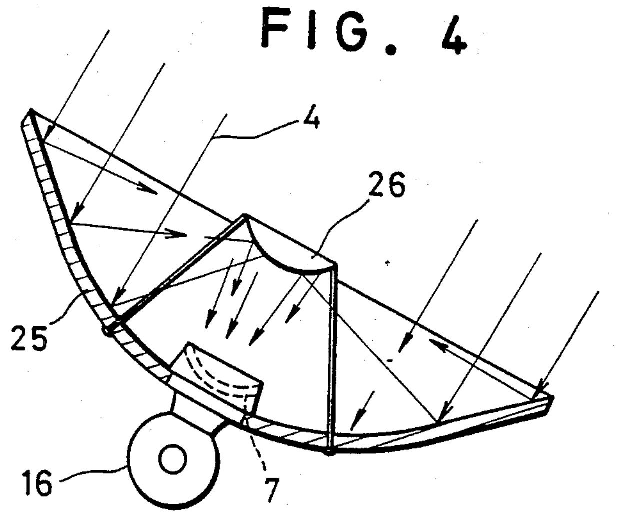
FIG. 4 is a sectional view showing a solar energy collector which can be used with the Stirling cycle engine in accordance with the present invention; and, FIG. 5 is a sectional view showing another example of the solar energy collector.

FIG. 4 shows an example of a solar radiation condenser which includes a parabolic mirror 25 secured to the cylinder head of the Stirling engine in accordance with the previously described embodiment of the present invention. A convex condenser mirror 26 is located substantially at the focal point of the parabolic mirror 25. The transparent top wall 7 of the stirling cycle engine is positioned in and supported by the parabolic mirror 25. In this structure, the transparent top wall 7 of the engine is shown as having a concave configuration. The solar radiation 4 is at first injected to the reflecting surface of the parabolic mirror 25 to be reflected toward the condenser mirror 26 which then reflects the radiation toward the transparent top wall 7 of the engine.

Figure 5:
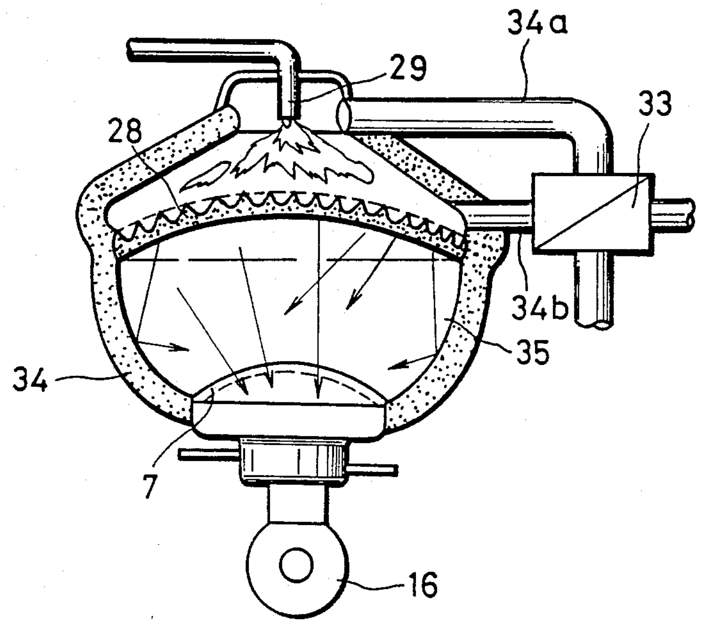

FIG. 5 shows another example of a device for applying the heat radiation to the engine in accordance with the present invention. This device includes a housing 34 of a heat resistant material defining an inside chamber 35 which is faced at the lower portion to the transparent top wall 7 of the engine in accordance with the present invention. The transparent top wall 7 is in this case of a convex configuration and supported by the housing 34 In the chamber 35 of the housing 34, there is provided a glow grid 28 which is made of a heat resistant ceramic material. Above the glow grid 28, there is provided a burner 29. A fresh air supply conduit 34*a* and an exhaust conduit 34*b* are provided to supply combustion air to the chamber 35 and exhaust the combustion gas from the chamber 35. The conduits are provided with a heat exchanger 33 for preheating the combustion air before it is introduced into the chamber 35.

The invention has thus been shown and described with reference to specific embodiments, however, it should be noted that the invention is in no way limited to the details of the illustrated structures but changes and modifications may be made without departing from the scope of the appended claims.

What is claimed:

1. A stirling cycle engine including cylinder means having cylinder head means and piston means disposed in said cylinder means to define working chamber means in said cylinder means, fluid passage means for passing working fluid into and out of said working chamber means, said fluid passage means being provided with cooling means for cooling said working fluid, heat accumulating means and heating means for heating said fluid passage means, said heating means including transparent wall means provided in said fluid passage means and fluid permeable heat receiving means provided in said passage means to receive heat radiation which has passed through said transparent wall means.

2. A stirling cycle engine in accordance with claim 1 in which said transparent wall means is made of a quartz glass and said heat receiving means is made of at least one of metallic net, ceramic fiber and carbon felt.

3. A stirling cycle engine in accordance with claim 1 in which said heat receiving means is provided in said piston means.

4. A stirling engine in accordance with claim 3 in which said piston means includes displacer piston means and a working piston means which is spaced apart from said displacer piston means, said heat receiving means is provided in said displacer piston means.

5. A stirling cycle engine in accordance with claim 1 in which said transparent wall means is of a concave configuration and support by a parabolic reflecting mirror, said parabolic mirror being confronted to a convex reflecting mirror.

6. A stirling cycle engine in accordance with claim 1 in which said transparent wall means is of a convex configuration, burner means being provided for applying radiating heat to said transparent wall means.

7. A stirling cycle engine comprising cylinder means having cylinder head means, first piston means received for slidable axial movement in said cylinder means and defining with said cylinder head means first chamber means, second piston means received for slidable axial movement in said cylinder means and defining together with said first piston means second chamber, passage means connecting said first and second chamber means, crankshaft means connected with said first and second piston means so that said first and second piston means are moved in out-of-phase relationship to provide in sequence a first isovolumetric stroke, an expansion stroke, a second isovolumetric stroke and a compression stroke, heating means provided in said cylinder head means for heating working fluid in said first isovolumetric stroke, said heating means includes transparent top wall means and heat receiving means of a heat absorbing material provided inside said transparent top wall means.

* * * * *

UNITED STATES PATENT AND TRADEMARK OFFICE

CERTIFICATE OF CORRECTION

PATENT NO. : 4,821,516

DATED : April 18, 1989

INVENTOR(S) : Naotsugu ISSHIKI

It is certified that error appears in the above-identified patent and that said Letters Patent is hereby corrected as shown below:

On the title page, item [73] should read as follows:

--Aisin Seiki Kabushiki Kaisha, Kariya, Japan, part interest.--

Signed and Sealed this

Twenty-sixth Day of June, 1990

*Attest:*

HARRY F. MANBECK, JR.

*Attesting Officer* *Commissioner of Patents and Trademarks*